United States Patent
Cheeley

(10) Patent No.: US 9,868,999 B2
(45) Date of Patent: Jan. 16, 2018

(54) METHODS AND SYSTEMS FOR PRODUCING DIRECT REDUCED IRON UTILIZING A PETROLEUM REFINERY BOTTOMS OR PETROLEUM COKE GASIFIER AND A HOT GAS CLEANER

(71) Applicant: Robert Cheeley, Charlotte, NC (US)

(72) Inventor: Robert Cheeley, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 203 days.

(21) Appl. No.: 14/798,840

(22) Filed: Jul. 14, 2015

(65) Prior Publication Data
US 2016/0017447 A1  Jan. 21, 2016

Related U.S. Application Data

(60) Provisional application No. 62/024,735, filed on Jul. 15, 2014.

(51) Int. Cl.
*C21B 13/00* (2006.01)
*C21B 13/02* (2006.01)
(Continued)

(52) U.S. Cl.
CPC .......... *C21B 13/0073* (2013.01); *C10K 1/004* (2013.01); *C10K 1/02* (2013.01);
(Continued)

(58) Field of Classification Search
CPC . C21B 13/0073; C21B 13/02; C21B 2100/02; C10K 1/004; C10K 1/02
See application file for complete search history.

(56) References Cited

U.S. PATENT DOCUMENTS 3,072,469 A     4/1963  Eastman et al.
4,235,625 A  *  11/1980  Tippmer ................. C10J 3/466
                                                       252/373
(Continued)

FOREIGN PATENT DOCUMENTS

CA              2848332 A1 *  3/2013  ............ C21B 13/002
WO  WO 2013027084 A1 *  2/2013  ............. C21B 11/02

OTHER PUBLICATIONS

Family list for WO 2013027084 (A1), published Feb. 28, 2013, from Espacenet.*

(Continued)

*Primary Examiner* — George Wyszomierski
*Assistant Examiner* — Tima M McGuthry Banks
(74) *Attorney, Agent, or Firm* — Clements Bernard Walker PLLC; Christopher L. Bernard

(57) ABSTRACT

Methods and systems for producing DRI utilizing a petroleum refinery bottoms (i.e. heavy fuel oil, vacuum residue, visbreaker tar, asphalt, etc.) or petroleum coke gasifier and a hot gas cleaner. Cooling of the hot synthesis gas generated by the petroleum refinery bottoms or petroleum coke gasifier to <200 C is not necessary. Rather, the synthesis gas from the petroleum refinery bottoms or petroleum coke gasifier is desulfurized and dedusted at high temperature (>350 C) using a hot gas cleaner, well known to those of ordinary skill in the art, although not in such an application. This hot gas cleaner may be high pressure or low pressure.

7 Claims, 3 Drawing Sheets

(51) Int. Cl.
*C10K 1/02* (2006.01)
*C10K 1/00* (2006.01)
*C21B 5/06* (2006.01)

(52) U.S. Cl.
CPC ............... *C21B 5/06* (2013.01); *C21B 13/02* (2013.01); *C21B 2100/42* (2017.05); *C21B 2100/44* (2017.05); *Y02P 10/122* (2015.11); *Y02P 10/212* (2015.11); *Y02P 10/265* (2015.11); *Y02P 10/283* (2015.11)

(56) References Cited

U.S. PATENT DOCUMENTS

| | | | |
|---|---|---|---|
| 4,365,789 A | 12/1982 | Scarlett et al. | |
| 5,429,658 A * | 7/1995 | Greenwalt | C21B 13/002 75/445 |
| 6,005,149 A * | 12/1999 | Bishop | C10J 3/06 201/27 |
| 6,149,859 A | 11/2000 | Jahnke et al. | |
| 2002/0078795 A1 | 6/2002 | Shigehisa et al. | |
| 2003/0047037 A1 * | 3/2003 | Sethna | B01D 53/047 75/505 |
| 2010/0050812 A1 * | 3/2010 | Van Heeringen | B01D 53/229 75/392 |
| 2011/0162278 A1 * | 7/2011 | DePuy | C10J 3/84 48/62 R |
| 2011/0173886 A1 | 7/2011 | Abraham et al. | |
| 2011/0247457 A1 * | 10/2011 | Knop | C21B 13/0046 75/392 |
| 2013/0205951 A1 | 8/2013 | Meissner et al. | |
| 2014/0260803 A1 * | 9/2014 | Zendejas-Martinez | C21B 11/02 75/505 |

OTHER PUBLICATIONS

Oct. 19, 2015 International Search Report issued in International Patent Application No. PCT/US15/0338.

Cheeley, Rob. Gasification and the Midrex Direct Reduction Process*: presented at the 1999, Gasification Technologies Conference, Oct. 17-20, 1999 [online] [retrieved on Sep. 22, 2015]. Retrieved from the Internet <URL: http://www.gasification.org/events/resourcelibrary?search: resource year= 1999&search:event_ type=Annuai+Conference&search :resource_ company=Midrex+Direct+Reduction+Corporation>.

Cheeley et al. "Coal gasification for DRI production—An Indian solution" Apr. 2010 [online][retrieved on Sep. 22, 2015]. Retrieved from the Internet <URL: http://www.steeltimesint.com/contentimages/features/STI_Midrex.pdf>.

* cited by examiner

US 9,868,999 B2

METHODS AND SYSTEMS FOR PRODUCING DIRECT REDUCED IRON UTILIZING A PETROLEUM REFINERY BOTTOMS OR PETROLEUM COKE GASIFIER AND A HOT GAS CLEANER

CROSS-REFERENCE TO RELATED APPLICATION

The present patent application/patent claims the benefit of priority of U.S. Provisional Patent Application No. 62/024,735, filed on Jul. 15, 2014, and entitled "METHODS AND SYSTEMS FOR PRODUCING DIRECT REDUCED IRON UTILIZING A GASIFIER AND A HOT GAS CLEANER," the contents of which are incorporated in full by reference herein.

FIELD OF THE INVENTION

The present invention relates generally to methods and systems for producing direct reduced iron (DRI). More specifically, the present invention relates to methods and systems for producing DRI utilizing a petroleum refinery bottoms (i.e. heavy fuel oil, vacuum residue, visbreaker tar, asphalt, etc.) or petroleum coke gasifier and a hot gas cleaner.

BACKGROUND OF THE INVENTION

In the production of DRI, it would be advantageous to utilize the hot synthesis gas (syngas) from a petroleum refinery bottoms or petroleum coke gasifier as a reducing gas. However, this is typically not feasible as the syngas must be cooled to <200 C to enable use of conventional technology for removing sulfur and dust, resulting in significant equipment costs and energy inefficiency.

Thus, in various exemplary embodiments, the present invention provides methods and systems for producing DRI utilizing a petroleum refinery bottoms or petroleum coke gasifier and a hot gas cleaner. Cooling of the hot synthesis gas to <200 C is not necessary. Rather, the syngas from the petroleum refinery bottoms or petroleum coke gasifier is desulfurized and dedusted at high temperature (>350 C) using a hot gas cleaner, well known to those of ordinary skill in the art, although not in such an application. This hot gas cleaner may be high pressure or low pressure.

BRIEF SUMMARY OF THE INVENTION

In one exemplary embodiment, the present invention provides a process for producing direct reduced iron, comprising: a direct reduction shaft furnace; a high pressure petroleum refinery bottoms or petroleum coke gasifier (typically 20-40 barg) operable for generating synthesis gas stream that is provided to the direct reduction shaft furnace as reducing gas stream; and a hot gas cleaner operable for desulfurizing and dedusting the synthesis gas stream to form the reducing gas stream. The process further comprising a top gas stream that is recovered from the direct reduction shaft furnace and provided to the synthesis gas stream as a recycle gas stream. The process further comprising a cooler/scrubber and a compressor collectively operable for cooling, scrubbing, and compressing the top gas stream.

The process further comprising a carbon dioxide removal unit operable for removing carbon dioxide from the top gas stream to form the recycle gas stream. The process further comprising a waste heat boiler operable for removing heat from a portion of the synthesis gas stream. The process further comprising a recycle gas heater operable for heating the recycle gas stream. The process further comprising a turbine generator operable for decreasing the pressure of the synthesis gas stream. The process further comprising a reducing gas heater operable for heating the reducing gas stream.

In another exemplary embodiment, the present invention provides a process for producing direct reduced iron, comprising: a direct reduction shaft furnace; a high pressure petroleum refinery bottoms or petroleum coke gasifier (typically 20-40 barg) operable for generating synthesis gas stream that is provided to the direct reduction shaft furnace as reducing gas stream; and a hot gas cleaner operable for desulfurizing and dedusting the synthesis gas stream to form the reducing gas stream. The process further comprising a top gas stream that is recovered from the direct reduction shaft furnace and provided to the synthesis gas stream as a recycle gas stream. The process further comprising a cooler/scrubber and a compressor collectively operable for cooling, scrubbing, and compressing the top gas stream. The process further comprising a carbon dioxide removal unit operable for removing carbon dioxide from the top gas stream to form the recycle gas stream. The process further comprising a direct contact cooler operable for removing heat from a portion of the synthesis gas stream. The process further comprising a recycle gas heater operable for heating the recycle gas stream. The process further comprising a turbine generator operable for decreasing the pressure of the synthesis gas stream. The process further comprising a reducing gas heater operable for heating the reducing gas stream.

In a further exemplary embodiment, the present invention provides a process for producing direct reduced iron, comprising: a direct reduction shaft furnace; a low pressure petroleum refinery bottoms or petroleum coke gasifier (typically 5-10 barg) operable for generating synthesis gas stream that is provided to the direct reduction shaft furnace as reducing gas stream; and a hot gas cleaner operable for desulfurizing and dedusting the synthesis gas stream to form the reducing gas stream. The process further comprising a top gas stream that is recovered from the direct reduction shaft furnace and provided to the synthesis gas stream as a recycle gas stream. The process further comprising a cooler/scrubber and a compressor collectively operable for cooling, scrubbing, and compressing the top gas stream. The process further comprising a carbon dioxide removal unit operable for removing carbon dioxide from the top gas stream to form the recycle gas stream. The process further comprising a reducing gas heater operable for heating the reducing gas stream.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Again, in various exemplary embodiments, the present invention provides methods and systems for producing DRI utilizing a petroleum refinery bottoms or petroleum coke gasifier and a hot gas cleaner. The synthesis gas from the petroleum refinery bottoms or petroleum coke gasifier is desulfurized and dedusted at high temperature (>350 C) using a hot gas cleaner, well known to those of ordinary skill in the art, although not in such an application. This hot gas cleaner may be high pressure or low pressure.

Figure 1:
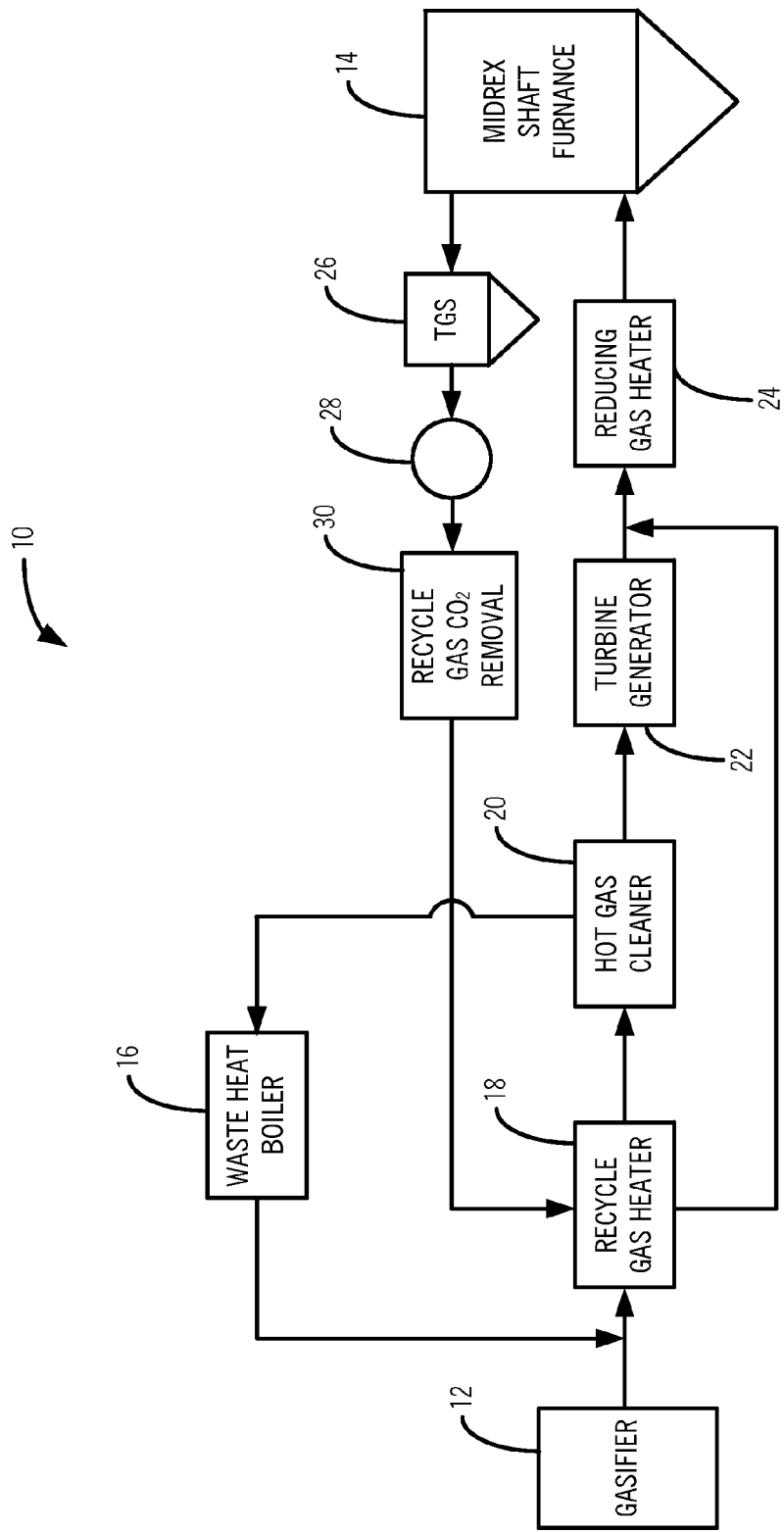
FIG. 1 is a flowsheet illustrating one exemplary embodiment of a method and system for producing DRI using a high pressure petroleum refinery bottoms or petroleum coke gasifier and a hot gas cleaner in accordance with the present invention.

Referring now specifically to FIG. 1, in one exemplary embodiment, the process 10 includes a high pressure petroleum refinery bottoms or petroleum coke gasifier (typically 20-40 barg) 12 for delivering syngas to a direct reduction (DR) shaft furnace 14 as reducing gas. Syngas derived from the petroleum refinery bottoms or petroleum coke gasifier 12 is first cooled from about 1300 degrees C. to about 900 degrees C. via introduction of a syngas stream from a waste heat boiler 16, discussed in greater detail herein below. The syngas stream is then passed through a recycle gas heater 18, also discussed in greater detail herein below, further reducing the temperature of the syngas stream to about 500 degrees C., while heating a recycle gas stream. The pressure throughout these steps remains relatively constant at >20 BARG.

Next, the syngas stream, at this still-elevated temperature, is introduced into the hot gas cleaner 20, which desulfurizes and dedusts the syngas stream, making it largely usable as reducing gas. Next, a portion of the syngas stream is withdrawn and fed to the waste heat boiler 16, where its temperature is reduced to about 200 degrees C. before being introduced into the syngas stream, discussed in greater detail herein above. In this respect, the waste heat boiler 16 acts as a pre-cooler for the syngas stream, ensuring that it does not get "sticky." Subsequently, the syngas stream is pressure reduced in a turbine generator 22 to about 3 BARG and about 400 degrees C. At this point, the syngas stream is mixed with the recycle gas stream that was fed through the recycle gas heater 18, still discussed in greater detail herein below. At the time of mixing, the recycle gas stream also has a pressure of about 3 BARG and a temperature of about 400 degrees C. The combined stream is then heated in a reducing gas heater 24 to a temperature of about 950 degrees C. and introduced into the DR shaft furnace 14 as reducing gas for the direct reduction of iron oxide, a process well known to those of ordinary skill in the art.

Top gas withdrawn from the DR shaft furnace 14 is cooled and scrubbed in a top gas scrubber 26 and compressed in a compressor 28 from about 1 BARG to about 3 BARG, with a temperature after cooling of about 30 degrees C. The cooled, scrubbed, and compressed top gas is then fed to a recycle gas CO2 removal unit 30, which removes much of the CO2 present, before being fed through the recycle gas heater 18 and into the syngas stream, discussed in greater detail herein above. The recycle gas heater 18 heats the recycle gas stream from about 30 degrees C. to about 400 degrees C., at a pressure of about 3 BARG, before it is introduced into the syngas stream.

Figure 2:
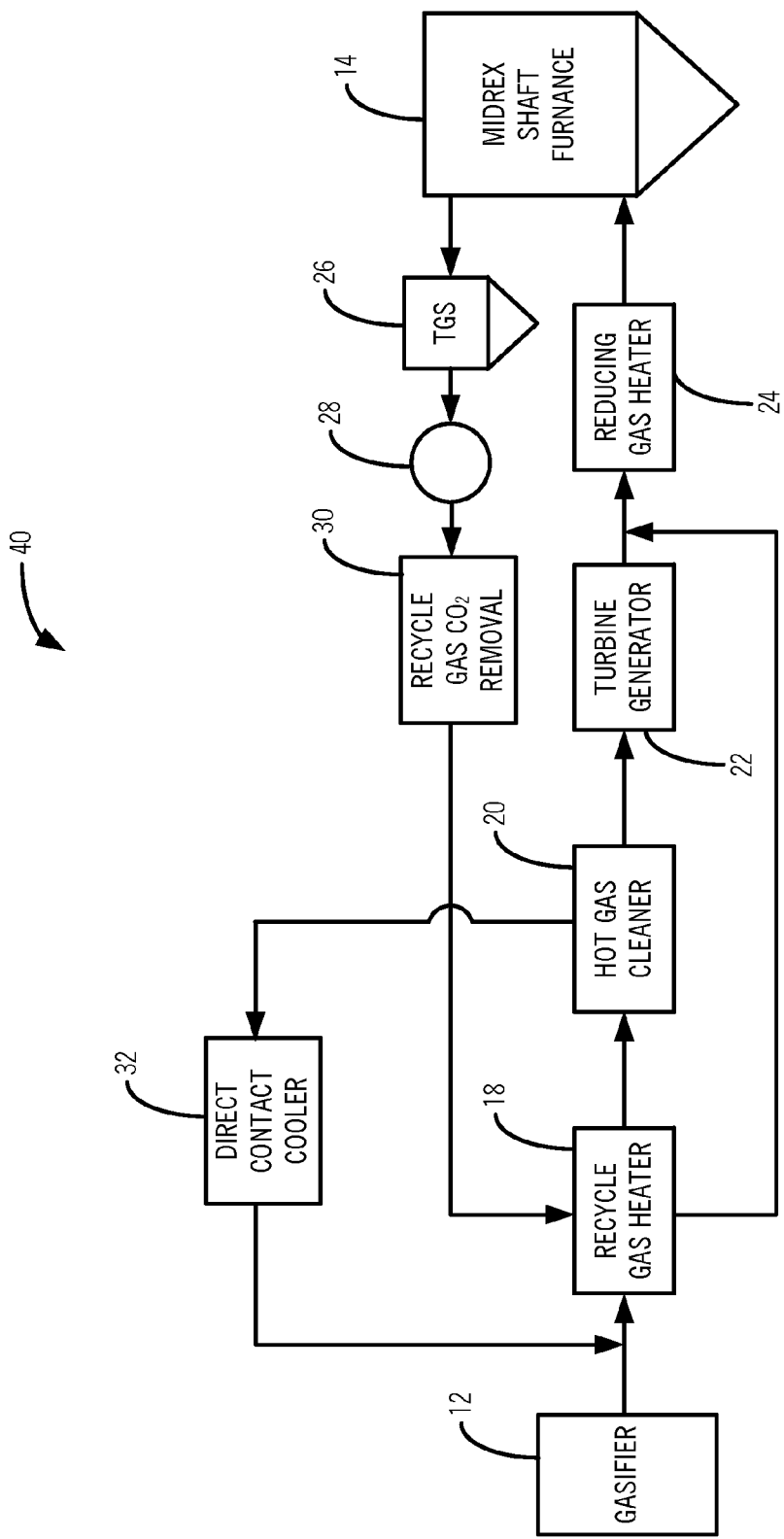
FIG. 2 is a flowsheet illustrating another exemplary embodiment of a method and system for producing DRI using a high pressure petroleum refinery bottoms or petroleum coke gasifier and a hot gas cleaner in accordance with the present invention.

Referring now specifically to FIG. 2, in another exemplary embodiment, the process 40 includes a high pressure petroleum refinery bottoms or petroleum coke gasifier (typically 20-40 barg) 12 for delivering syngas to a DR shaft furnace 14 as reducing gas. Syngas derived from the petroleum refinery bottoms or petroleum coke gasifier 12 is first cooled from about 1300 degrees C. to about 900 degrees C. via introduction of a syngas stream from a direct contact cooler 32, discussed in greater detail herein below. The syngas stream is then passed through a recycle gas heater 18, also discussed in greater detail herein below, further reducing the temperature of the syngas stream to about 500 degrees C., while heating a recycle gas stream. The pressure throughout these steps remains relatively constant at >20 BARG.

Next, the syngas stream, at this still-elevated temperature, is introduced into the hot gas cleaner 20, which desulfurizes the syngas stream, making it largely usable as reducing gas. Next, a portion of the syngas stream is withdrawn and fed to the direct contact cooler 32, where its temperature is reduced to about 50 degrees C. before being introduced into the syngas stream, discussed in greater detail herein above. In this respect, the direct contact cooler 32 acts as a pre-cooler for the syngas stream, ensuring that it does not get "sticky." Subsequently, the syngas stream is pressure reduced in a turbine generator 22 to about 3 BARG and about 400 degrees C. At this point, the syngas stream is mixed with the recycle gas stream that was fed through the recycle gas heater 18, still discussed in greater detail herein below. At the time of mixing, the recycle gas stream also has a pressure of about 3 BARG and a temperature of about 400 degrees C. The combined stream is then heated in a reducing gas heater 24 to a temperature of about 950 degrees C. and introduced into the DR shaft furnace 14 as reducing gas for the direct reduction of iron oxide, a process well known to those of ordinary skill in the art.

Top gas withdrawn from the DR shaft furnace 14 is cooled and scrubbed in a top gas scrubber 26 and compressed in a compressor 28 from about 1 BARG to about 3 BARG, with a temperature after cooling of about 30 degrees C. The cooled, scrubbed, and compressed top gas is then fed to a recycle gas CO2 removal unit 30, which removes much of the CO2 present, before being fed through the recycle gas heater 18 and into the syngas stream, discussed in greater detail herein above. The recycle gas heater 18 heats the recycle gas stream from about 30 degrees C. to about 400 degrees C., at a pressure of about 3 BARG, before it is introduced into the syngas stream.

Figure 3:
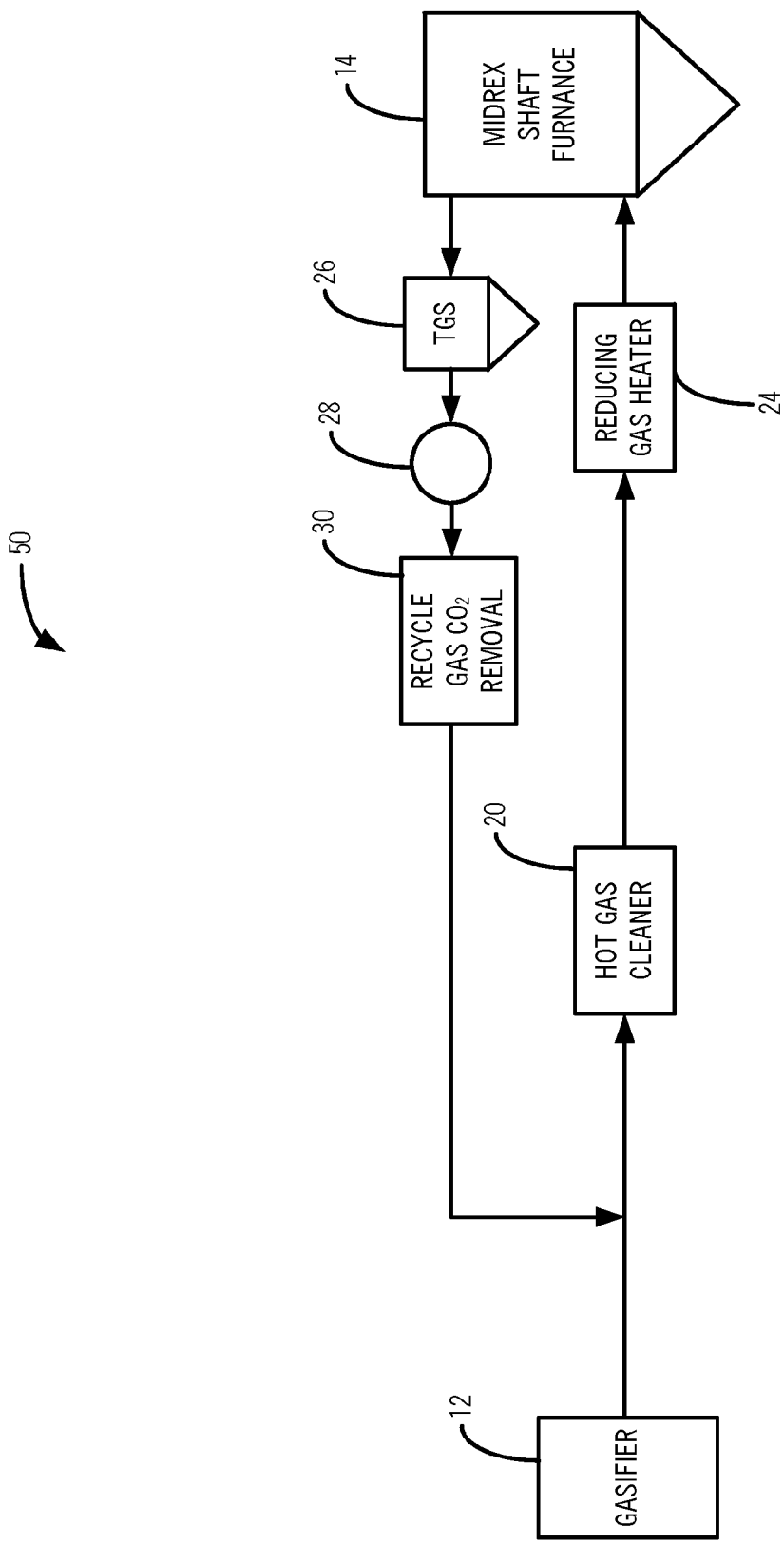
FIG. 3 is a flowsheet illustrating a further exemplary embodiment of a method and system for producing DRI using a low pressure petroleum refinery bottoms or petroleum coke gasifier and a hot gas cleaner in accordance with the present invention.

Referring now specifically to FIG. 3, in a further exemplary embodiment, the process 50 includes a low pressure petroleum refinery bottoms or petroleum coke gasifier (typically 5-10 barg) 12 for delivering syngas to a DR shaft furnace 14 as reducing gas. Syngas derived from the petroleum refinery bottoms or petroleum coke gasifier 12 is first cooled from about 1300 degrees C. to about 500 degrees C. via introduction of a recycle gas stream from the DR shaft furnace 14, discussed in greater detail herein below. The pressure throughout this step remains relatively constant at 5-10 BARG.

Next, the syngas stream, at this still-elevated temperature, is introduced into the hot gas cleaner 20, which desulfurizes and dedusts the syngas stream, making it largely usable as reducing gas. Subsequently, the syngas stream is heated in a reducing gas heater 24 to a temperature of about 950 degrees C. and introduced into the DR shaft furnace 14 as reducing gas for the direct reduction of iron oxide, a process well known to those of ordinary skill in the art.

Top gas withdrawn from the DR shaft furnace 14 is cooled and scrubbed in a top gas scrubber 26 and compressed in a compressor 28 from about 1 BARG to about 5 BARG, with a temperature after cooling of about 30 degrees C. The cooled, scrubbed, and compressed top gas is then fed to a recycle gas CO2 removal unit 30, which removes much of the CO2 present, before being fed into the syngas stream, discussed in greater detail herein above.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A process for producing direct reduced iron, comprising:
    providing a direct reduction shaft furnace;
    coupling one of a high pressure and a low pressure petroleum refinery bottoms or petroleum coke gasifier to the direct reduction shaft furnace operable for generating a synthesis gas stream that is provided to the direct reduction shaft furnace as reducing gas stream; and
    providing a hot gas cleaner operable for desulfurizing and dedusting the synthesis gas stream at an elevated temperature of greater than 350 degrees C. to form the reducing gas stream;
    wherein the synthesis gas stream is cooled to a temperature of between 500 degrees C. and 900 degrees C. between the gasifier and the hot gas cleaner by exposure of the synthesis gas stream to one of a cooling stream from a waste heat boiler coupled to the hot gas cleaner and, a cooling stream from a direct contact cooler coupled to the hot gas cleaner.

2. The process of claim 1, further comprising recovering a top gas stream from the direct reduction shaft furnace and providing the top gas stream to the synthesis gas stream as the recycle gas stream.

3. The process of claim 2, further comprising providing a cooler/scrubber and a compressor collectively operable for cooling, scrubbing, and compressing the top gas stream.

4. The process of claim 2, further comprising providing a carbon dioxide removal unit operable for removing carbon dioxide from the top gas stream to form the recycle gas stream.

5. The process of claim 2, further comprising providing a recycle gas heater operable for heating the recycle gas stream.

6. The process of claim 1, further comprising providing a turbine generator operable for decreasing the pressure of the synthesis gas stream.

7. The process of claim 1, further comprising providing a reducing gas heater operable for heating the reducing gas stream.

\* \* \* \* \*